March 31, 1970  E. LEVY  3,503,580
UNIVERSAL CONDUIT SUPPORT BRACKET
Filed March 25, 1968  2 Sheets-Sheet 1
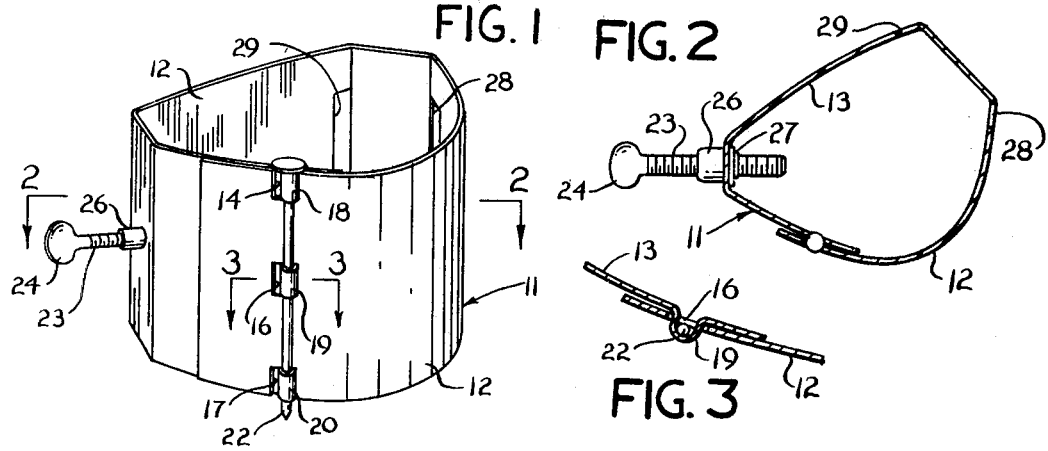
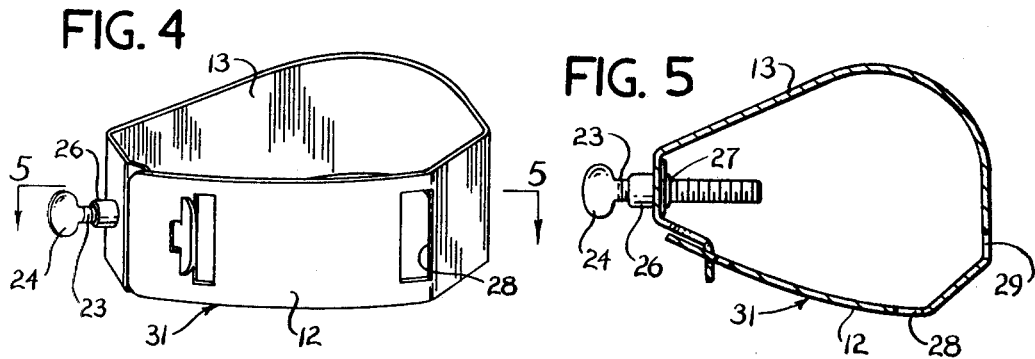
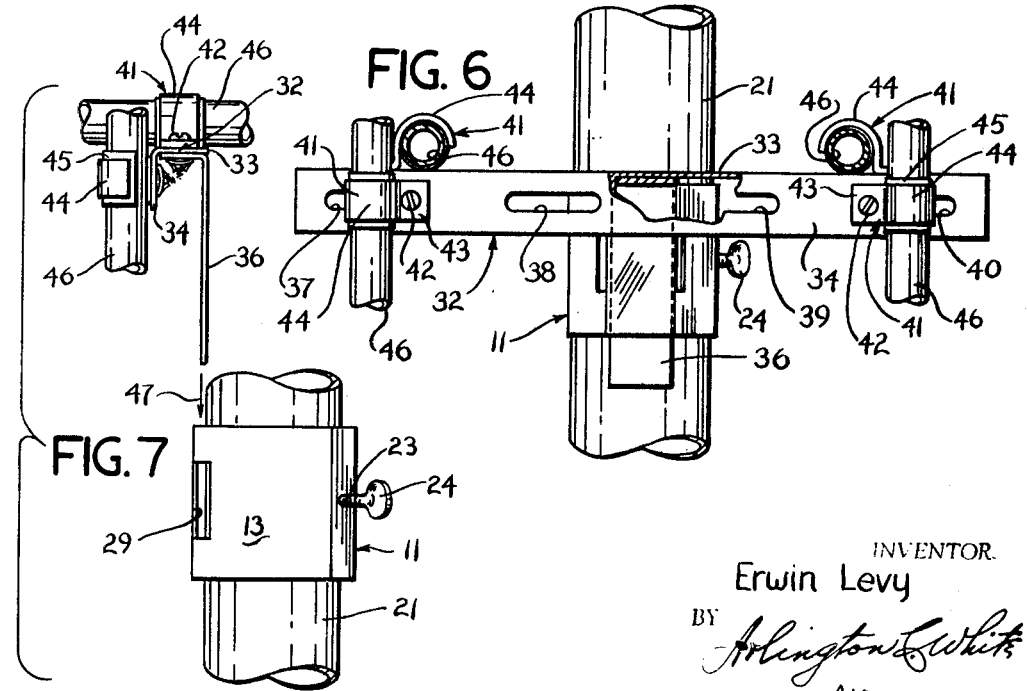
INVENTOR.
Erwin Levy
BY *Arlington White*
Attorney March 31, 1970     E. LEVY     3,503,580
UNIVERSAL CONDUIT SUPPORT BRACKET
Filed March 25, 1968     2 Sheets-Sheet 2
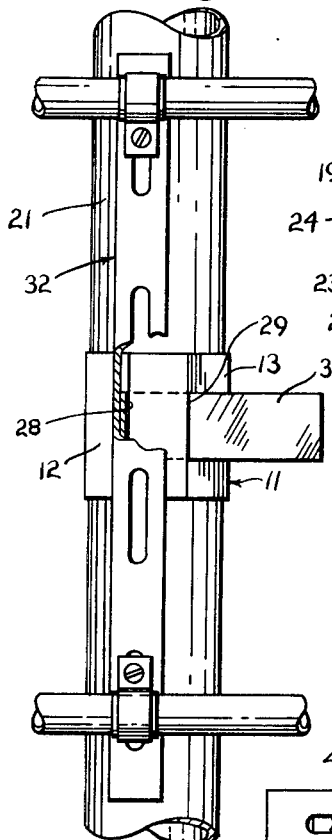
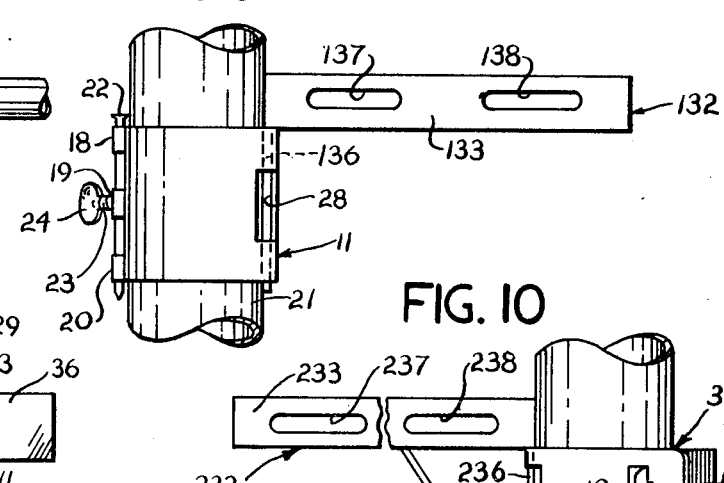
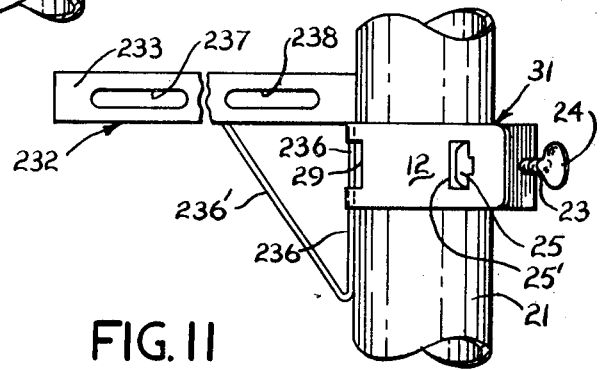
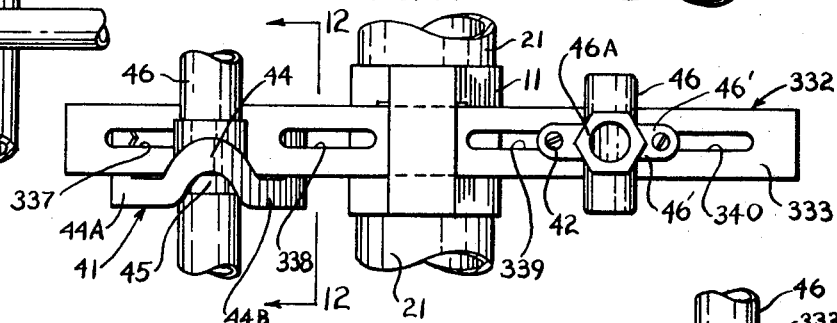
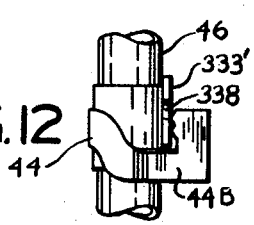
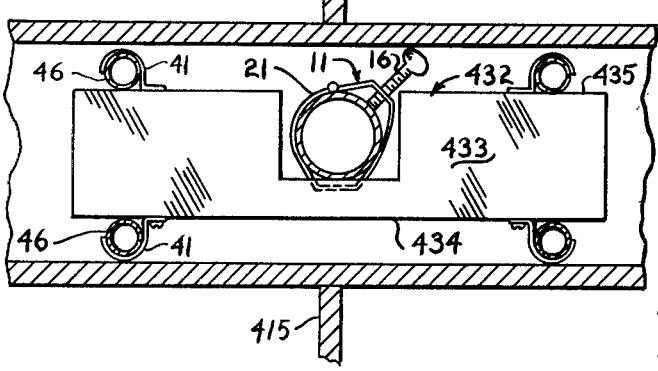
INVENTOR.
Erwin Levy
BY
*Arlington G. White*
Attorney United States Patent Office 3,503,580
Patented Mar. 31, 1970

3,503,580
UNIVERSAL CONDUIT SUPPORT BRACKET
Erwin Levy, 2728 41st Ave.,
San Francisco, Calif. 94116
Filed Mar. 25, 1968, Ser. No. 715,672
Int. Cl. F16l 3/12
U.S. Cl. 248—62                               7 Claims

ABSTRACT OF THE DISCLOSURE

The invention comprises, in combination with a waste pipe or a vent pipe in a building, a split collar adapted to be adjustably fastened in encircling relation about said pipe; said collar being provided with a pair of slots arranged in one wing thereof in spaced relationship to one another, an elongated bracket extendable through said slots of said collar and thereby mountable on said collar in any selected one of a plurality of laterally extendable positions in relation to said pipe, and means adjustably mounted on said bracket for effecting clamping engagement with conduits in the building in proximity to said pipe and extending at various angular relationships thereto.

---

A primary object of the present invention is to provide a universal conduit support bracket which will secure against displacement a plurality of conduits in a building despite the relative angular dispositions of the conduits.

Another important object of my invention is to provide a universal conduit support bracket of the indicated nature which is additionally characterized by its ease of installation and adjustment to accommodate varying locations of conduits in relation to a stationary member in a building such as a waste pipe or a vent pipe.

A still further object of the invention is to provide a universal conduit support bracket of the above-mentioned character which will hold conduits of various sizes against displacement in respect to a stationary member.

Another object of the invention is to provide a universal conduit support bracket which is relatively inexpensive to manufacture and install and which requires but little or no maintenance expense.

Other objects of the invention, together with some of the advantageous features thereof, will appear from the following description of a preferred embodiment of the invention as well as certain modified embodiments thereof which are illustrated in the accompanying drawings. It is to be understood, however, that I am not to be limited to the precise embodiment illustrated nor to the precise arrangement or locations of component parts thereof, as my invention can be embodied in a plurality and variety of forms.

Referring to the drawings:

FIG. 1 is a perspective view of the split collar component of a preferred embodiment of the invention.

FIG. 2 is a sectional view of the component shown in FIG. 1, this view being taken on the line 2—2 thereof.

FIG. 3 is a sectional detail of a portion of the collar component of a preferred embodiment of the invention, this view being taken on the line 3—3 of FIG. 1.

FIG. 4 is a perspective view of a modified collar component of a modified embodiment of the invention.

FIG. 5 is a sectional view taken on the line 5—5 of FIG. 4.

FIG. 6 is a fragmentary elevational view partly in section of a preferred embodiment of the invention installed in operative position on a stationary member in a building.

FIG. 7 is an exploded elevational view of the various components of a preferred embodiment of the invention prior to full installation and showing the holding of conduits disposed at different angular relationships against displacement.

FIG. 8 is an elevational view of a preferred embodiment of the invention.

FIG. 9 is still another elevational view of a preferred embodiment of the invention with a modified bracket component.

FIG. 10 is an elevational view of modified collar and bracket components of a modified embodiment of the invention.

FIG. 11 is an elevational view of a collar component and modified bracket component of a modified embodiment of the invention illustrating a modified clamp on the bracket.

FIG. 12 is a view taken on the line 12—12 of FIG. 11.

FIG. 13 is a longitudinal view of a collar component and modified bracket component of a modified embodiment of the invention installed between adjacent walls of a building for supporting conducts leading to wash basins in adjacent rooms of the building.

FIG. 14 is a schematic elevational view of the modified embodiment illustrated in FIG. 13.

In its preferred form, the universal conduit support bracket of the present invention preferably comprises, in combination with a waste pipe or vent pipe in a building and with conduits disposed in proximity to said pipe, a split-collar adapted to be adjustably closed in encircling engagement about said pipe; said split-collar having a pair of slots therethrough in spaced relationship to one another, together with a bracket consisting of two sides arranged at right angles to one another each having a series of longitudinally spaced openings therein, at least one flange depending from one of said sides; said bracket being adjustably mounted in any selected one of a plurality of laterally ending positions on said pipe through the medium of said split-collar and said slots therein, and a series of clamps adjustably mounted in said series of openings for effecting clamping engagement with said conduits extending in proximity to and at angular relationship in respect to said pipe.

A modified embodiment of my invention comprises, in combination with a waste pipe or vent pipe in a building as well as with a plurality of conduits in proximity to and extending angularly in respect to one another, a split-collar having a pair of slots therethrough, means on said collar for adjustably positioning said split-collar on said pipe, tightening means on said collar for fastening it to said pipe, together with a bracket comprising a flat strip having a series of longitudinally spaced openings therein, a flange depending from one end of said strip for passing through said slots of said collar whereby said strip may be retained in engagement with said pipe in any selected one of a plurality of laterally extendable positions, and a series of clamps adjustably mounted in said openings for effecting clamping engagement with conduits in proximity to said pipe.

Another modified embodiment of the invention comprises, in combination with a waste pipe or vent pipe located in a building as well as with conduits disposed in proximity thereto, a split-collar having a pair of slots therein, means on said collar for adjustably closing the same in encircling relation about said pipe, and a strip adjustably passing through said slots for engagement in any selected one of a plurality of laterally extendable positions in relation to said pipe; said strip having a plurality of longitudinally spaced openings therein, and a plurality of clamps adjustably mounted in said openings for effecting clamping engagement with said conduits to hold the same against displacement relative to one another and to said pipe.

As particularly illustrated in FIGS. 1 to 3 inclusive of the annexed drawings, I provide as one component of the preferred embodiment of my present invention a split-collar generally designated by the reference numeral 11 which is conveniently fabricated from flexible sheet steel, or copper or other siutable material. The split-collar 11 defines a pair of wings 12 and 13 and is so fashioned as to provide on one end of wing 12 a series of apertures or openings including opening 14 adjacent to and through the top edge of the wing, an opening 16 at the transverse center of the wing 12, and an opening 17 adjacent to and through the bottom edge of wing 12. On the proximate end of wing 13, there are provided and welded thereto three eyelets 18, 19 and 20 which, when the wings are lapped to close the split-collar, will register with the openings 14, 16 and 17, respectively. To latch the split-collar 11 in a closed position encircling a waste or vent pipe 21 in a building, I provide a pin 22 which is extended through eyelets 18, 19 and 20 to hold wings 12 and 13 together. While not shown in this view it is to be understood that other means can be employed for holding the wings of the split-collar together such as providing longitudinally spaced slots adjacent one end of wing 12 and providing a tongue on the outer end of wing 13 thereby permitting adjustability of the split-collar by inserting the tongues into any one of the longitudinally spaced slots at the end of wing 12 and bending the tongue upon itself. This will enable the mounting of the collar 11 on waste or vent pipes of different sizes.

In order to securely mount the collar in any selected position on waste pipe 21, I provide an adjustable set-screw 23 fashioned with a wing type end piece 24 and being extendable through a hole in the collar and through a threaded opening in a block 26 which is provided on the outside of the collar and which cooperates with a washer 27 on the inside of the collar to force the inner end of block 26 into bearing engagement with the collar as well as to force the inner end of set-screw 23 into bearing engagement with the waste pipe 21 when the screw is turned down by turning in one direction of rotation thereby holding the collar against displacement on the pipe 21. Turning of the screw 23 in the opposite direction of rotation will relieve the pressure and engagement of the inner end of the screw with the pipe 21 so that the collar can be adjustably moved and fastened to the pipe in another selected position.

In accordance with my present invention, I so fashion the spilt-collar 11 as to provide therein a pair of transversely extending slots 28 and 29 therein which will assume vertical positions when the collar is mounted on pipe 21. The slots 28 and 29 can be formed both in wing 12 or can be separated so as to have the slot 28 in wing 12 and the slot 29 in wing 13. With both of the slots 28 and 29 in wing 12, the wing can be flexed more readily which will facilitate the lapping of the two wings and the latching together of the same by latching pin 22. This feature is especially advantageous in connection with a split-collar of the type shown in FIGS. 4 and 5 of the drawings, which is designated generally by the reference numeral 31 and which not only is made of heavier metal of greater thickness than the split-collar 11 shown in FIGS. 1 and 2 but also which is fabricated narrower in width. In this modification, it is to be noted that the vertical slots 28 and 29 are formed in the wing 12 which enables ready flexing of such wing notwithstanding its greater thickness and over-all strength. The modification of collar shown in FIGS. 4 and 5 and designated by the reference numeral 31 is devised for enabling the support on the waste or vent pipe 21 of greater than normal sizes of conduits or ranging from one and one-half inch to two and one-half inches or three inches in diameter.

As will appear from the following description and as illustrated in the annexed drawings, the collar 11 is adapted to support and to hold against displacement a variety of different brackets on the waste pipe or vent pipe 21. In FIGS. 6 and 7, I have illustrated a bracket which is designated generally by the reference numeral 32 and which consists of a pair of sides 33 and 34 extending at right angles to each other and from one side of which depends a flange 36. The sides of the bracket 32 are formed with a series of longitudinally spaced openings 37, 38, 39 and 40 therein for adjustably mounting a series of clamps 41 by means of screws 42 extending therethrough and tightened down against a base 43 of each clamp. As shown, each clamp 41 includes an arcuate portion 44 which partially encircles with an intermediate protective strip 45 a conduit 46, and upon tightening of screws 42 there is effected a clamping engagement of the clamp and the conduits. In FIG. 6, four conduits 46 are shown of which two are disposed in vertical planes in spaced relationship to one another and to the waste pipe 21 while two of the conduits 46 are disposed in horizontal planes in spaced relationship to one another and to the waste pipe 21. In FIG. 7, the bracket 32, together with depending flange 36 and with the clamps 41 in clamping engagement with conduits 46 is shown prior to the mounting of the bracket 32 upon the collar 11 and the pipe 21. The small arrow 47 in FIG. 7 indicates the direction of movement of the bracket 32 for installation or mounting of the bracket on the collar, with the flange 36 extending inside the collar to be brought into bearing engagement with pipe 21 when the set-screw 23 is tightened against the waste pipe. Should the conduits 46 be positioned in a different relationship to the pipe 21 than as illustrated in FIG. 6, the entire bracket 32 can be disposed also in a different relation to the pipe 21 by extending the flange 36 of the bracket 32 through the vertical slots 28 and 29 of collar 11 before it is tightened into engagement with the waste pipe 21.

The distance laterally that the flange 36 of bracket 32 is extended through slots 28 and 29 of collar 11 depends upon the locations of the small conduits 46 in relation to the pipe 21 as for example the locations of the small conduits which are shown in FIG. 11 in relation to the waste pipe. While not shown in the drawing, the bracket 32 can be provided with a series of longitudinally spaced depending flanges 36 and any one flange can be disposed within the collar 11 thereby affording lateral adjustment of the bracket to accommodate for different locations of the small conduits in relation to the waste pipe 21. It is, of course, to be understood that any selected one of the plurality of depending flanges 36 can be passed through vertical slots 28 and 29 of collar 11 thus providing universal adjustment of the collar support and bracket in relation to the pipe 21 for securing a variety of small conduits at greater or lesser distances from pipe 21 and at different angular relationships to one another and to the pipe 21 against displacement.

In FIG. 9 of the annexed drawings, I have illustrated a modified embodiment of the bracket component of my present invention, this view, however, omitting the bracket clamps for effecting clamping engagement with small conduits, also not shown. In this modification, the bracket which is designated generally by the reference numeral 132 is fabricated of a single strip 133 of steel, copper or steel or copper alloy and is, provided at one end thereof with a depending flange 136; such strip 133 being fashioned with a series of longitudinally spaced openings 137 and 138 therein for receiving the clamps, not shown. The dotted and full line showing of depending flange 136 of strip 133 illustrates the simple mounting of this embodiment of bracket component. The installation is effected by first loosening the set-screw 23 of the collar 11 to permit insertion of the flange 136 within the collar 11 between the inner surface of the collar and the outer surface of the waste pipe 21, and thereafter tightening the set-screw 23 again so that its inner end bears against the pipe 21 and the collar is securely fastened with the bracket 132 fixedly mounted against displacements. It is clear that the bracket 132 may be mounted differently on or in relation to collar 11 by passing the flange 136 through the provided vertical slots of collar 11 of which but one is shown in FIG. 9.

In the event that larger conduits are disposed in close proximity to the waste pipe 21 which range in diameter between one and one-half to two and one-half inches or three inches, the modified bracket shown in FIG. 10 and designated by the reference numeral 232 is preferably employed with the narrow width and thicker collar 31, also shown in FIGS. 5 and 6. The modified bracket 232 comprises a flat strip 233 provided at an end thereof with a depending flange 236 which is braced by an integral brace rod 236' extending between the flange 236 and the strip 233 to lend increased strength to the bracket for supporting the heavier conduits, not shown in this view. The bracket strip 233 is fashioned similarly to the bracket strip 133 in that is provided with a series of longitudinally spaced openings 237 and 238 for adjustably mounting a series of conduit engaging clamps, not shown. In mounting this modification of bracket component upon the waste pipe 21, the outer face of the flange 236 is first held against the outer face of pipe 21, and then the wings of the collar 11 are disposed around the inner face of the depending flange 236 and about the pipe 21. The wings of collar 11 are then brought together and the collar closed about the flange of the pipe by passing a tongue 25 provided on one end of one wing of the collar through a slot 25' formed in the other collar wing and turning the tongue 25 upon itself and against the collar surface. Thereafter, the set-screw 23 is turned to bring its inner end into engagement with the outer surface of pipe 21.

In both FIGS. 8 and 11, I have illustrated the mounting of a bracket component upon a collar component using in both cases, the vertical slots 28 and 29 of the collar 11 for passing a flange 36 of a bracket therethrough or for passing a single strip type bracket therethrough. In the view of FIG. 8, the bracket 32 is of the same type as that shown in FIG. 6 wherein the depending flange 36 is shown in dotted lines and the bracket is mounted horizontally in relation to the waste pipe. In FIG. 8, the same type of bracket 32 is mounted vertically in respect to the waste pipe 21, and it is to be especially noted that a flange 36 of bracket 32 extends through the vertically formed slots 28 and 29 of the collar 11 which, of course, can be adjustably positioned up or down the waste pipe 21 depending upon the locations of the small conduits 46 in relation to the waste pipe and their distances apart. Of course, additional depending or projecting flanges 36 can be provided on the bracket 32 and any selected one of the plurality of flanges 36 can be passed through the vertical slots 28 and 29 of collar 11 thus affording adjustment of the bracket 32 itself in relation to the collar 11 and also in relation to the waste pipe 21. The showing in FIG. 8 illustrates the holding against displacement of two horizontally disposed conduits 46 by means of the adjustably mounted clamps 41 carried by the bracket 32.

In FIG. 11, a further modification of a bracket component is illustrated and designated by the reference numeral 332. This modification comprises a single metal strip 333 having a series of longitudinally spaced openings 337, 338, 339 and 340 therein for adjustably mounting modified clamping vertically disposed conduits at various differences from a waste or vent pipe 21 and held against displacement. As shown, the strip 333 is passed through the vertical slots 28 and 29 of the collar 11, which encircles the pipe 21, and it is to be noted that the strip 333 can be secured against the waste pipe in any selected one of a plurality of laterally extended and adjusted positions thus enabling the clamping of conduits which are both near to and far from the waste pipe 11. One of the modified clamping components 41 is shown at the right in FIG. 11 and comprises an integral part of a conduit 46 which is formed with oppositely extending flat apertured flanges 46' that can be secured directly to the flat surface of the strip 333 by means of screws 42 which extend through the openings 339 and 340 of the bracket as well as through the apertures of the apertured flanges 46' on the conduit 46. The screws can be turned down tightly into flat nuts, not shown, bearing against the opposite side of the flat strip 333 of this modified bracket component 332. The conduit 46 shown in FIG. 11 may consist of a T-section with a threaded T-head 46A projecting normal thereto as well as normal to the strip 333. At the left side of FIG. 11, a further modified clamp component is illustrated and also shown in detail in FIG. 12. This modified clamp component comprises a bendable strip of flexible material, such as soft rubber, which includes an arcuate conduit engaging portion 44, which can overlie a protective shield 45, as well as integral curved terminals 44A and 44B which are turned under the metal strip and which have serrated ends thereon seated in the openings 337 and 338 of strip 333 on its reverse side 333', see FIG. 12, thereby to firmly clamp a conduit 46 to the outside of the bracket 332. These two modifications of clamp components can be employed on any of the other brackets illustrated in the annexed drawings for holding conduits 46 in clamping engagement therewith.

I have illustrated in FIGS. 13 and 14 of the annexed drawings a still further modification of a bracket component which is designated by the reference numeral 432. This modification has especial use and advantageous application to the environment of adjoining bathrooms in apartment houses, hotels and motels which are separated by walls or partitions 410 and 415, see FIG. 13, and wherein washbasins in the adjoining bathrooms have a common waste pipe for drainage of water. As shown, the bracket 432 is fashioned with a flat platform-like top 433 with depending sides 434 and 435. Each of the sides of bracket 432 is formed with a plurality of longitudinally spaced openings therein of which but one is shown in FIG. 14, as indicated by the reference numeral 437, for adjustably mounting on the bracket a series of clamps 441 which can be similar to those shown in FIGS. 6 and 7 and thereby retain a number of small conduits 46, such as water pipes leading from the various washbasins, not shown, in different adjoining rooms to the main waste pipe 21 upon which the collar 11 is adjustably mounted and tightened in adjusted position to the waste pipe 21 by means of set screw 23. The bracket 432 is provided with a depending flange 436 which is extended into the collar 11 between the inner surface of the collar and the outer surface of waste pipe 21 before tightening of the collar, as indicated by the dotted line showing in FIG. 13.

By virtue of the combination of the waste or vent pipe 21 of a building with any one or more of the brackets 32, 132, 232, 332 or 432 functioning in conjunction with either the collar 11 or the collar 31, as above described, there are provided universal conduit support brackets for handling a variety of different applications in retaining a series of small light-weight water conduits, electrical conduits or the like or larger heavier conduits, against displacement in relation to a fixed waste or vent pipe in a building. This universality of applications of the combinations described permits the fastening against displacement of a plurality of the conduits 46 which are disposed in varying distances from the waste pipe 21 or in varying angular relationships in respect to such fixed pipe 21.

I claim:

1. A universal conduit support bracket comprising, in combination with a fixed waste pipe in a building, a split collar adjustably attached in closed and encircling relation about said pipe; said split collar having a pair of slots therethrough in spaced relationship to one another, an elongated bracket adjustably extended through said pair of slots of said split collar for fastening the same to said waste pipe in any selected one of a plurality of different extended positions in relation to said pipe, and a series of clamps adjustably mounted on said bracket for clamping engagement with conduits disposed in proximity to said waste pipe at angularly disposed relationship thereto.

2. A universal conduit support bracket comprising, in combination with a fixed waste pipe in a building and with a plurality of conduits disposed in proximity to and at various angular relationships to said waste pipe, a split collar, means on said collar for closing and fastening the same on said waste pipe in encircling relation thereto; said split collar having a pair of vertically arranged slots therethrough in spaced relationship to one another, an elongated strip removably and adjustably mounted on said collar with a portion of the strip engaging a portion of said waste pipe by passing through said slots of said collar, and a series of clamps adjustably mounted on said strip for clamping engagement with said conduits to hold the same against displacement with respect to said waste pipe.

3. A universal conduit support bracket as defined in claim 2, and a flange depending from said strip for mounting said strip upon said collar with said flange extending between the inside of said collar and the outside of said waste pipe.

4. A universal conduit support strip as defined in claim 3 wherein said flange depends from an end of said strip.

5. A universal conduit support bracket as defined in claim 3 wherein said flange depends from said strip between the ends thereof.

6. A universal conduit support bracket as defined in claim 3, and a brace rod extending angularly between the bottom of said flange and said strip.

7. A universal conduit support bracket for securing a plurality of conduits arranged in different planes against displacement from a fixed waste or vent pipe in a building; said conduit support bracket comprising a collar adjustably mounted on said waste pipe; said collar having a pair of vertically arranged slots therethrough in spaced relationship to one another, an elongated bracket consisting of two sides at right angles to one another removably mounted in any one of a plurality of selected different positions on said collar with one side of said bracket passing through said vertical slots of said collar, and a series of clamps adjustably mounted on said sides of said bracket for clamping engagement with conduits disposed on opposite sides of and in different planes with respect to said waste pipe to hold said conduits against displacement.

References Cited

UNITED STATES PATENTS

| 1,365,150 | 1/1921 | Brown | 211—107 |
| 2,529,173 | 11/1950 | Moyer | 248—230 X |
| 2,535,427 | 12/1950 | Kindorf | 248—68 |
| 2,972,460 | 2/1961 | Kenyon | 248—68 X |
| 3,332,654 | 7/1967 | Jacobson | 248—221 |

CHANCELLOR E. HARRIS, Primary Examiner

U.S. Cl. X.R.

248—221, 231